INVENTORS
FREDERIC E. HOWDLE
CHARLES W. OTTO
BY W. E. Dyson
ATTORNEY

INVENTORS
FREDERIC E. HOWDLE
CHARLES W. OTTO
BY W. E. Bryson
ATTORNEY

INVENTORS
FREDERIC E. HOWDLE
CHARLES W. OTTO
BY W. C. Bryson
ATTORNEY

United States Patent Office

Re. 25,018
Reissued Aug. 8, 1961

25,018

MACHINE FOR AND METHOD OF COUNTING AND STACKING NEWSPAPERS AND THE LIKE

Frederic E. Howdle, Wauwatosa, Wis., and Charles W. Otto, De Kalb, Ill., assignors to Cutler-Hammer, Inc., Milwaukee, Wis., a corporation of Delaware Original No. 2,819,661, dated Jan. 14, 1958, Ser. No. 360,674, June 10, 1953. Application for reissue Jan. 27, 1961, Ser. No. 85,439

22 Claims. (Cl. 93—93)

Matter enclosed in heavy brackets [ ] appears in the original patent but forms no part of this reissue specification; matter printed in italics indicates the additions made by reissue.

This invention relates to improvements in machines for [and methods of] counting and stacking newspapers and the like.

A machine of this type is described and claimed in the application of Hansen and Ormsby, Serial No. 227,472, now U.S. Patent No. 2,697,388. In such machine the newspapers were separated from their lapped stream into spaced relation flow, automatically counted while in such spaced flow, deposited alternatingly on two stacking tables to form bundles, and then delivered in bundles to the bundle conveyor. The step of changing the lapped stream into separated flow is time consuming. The mechanism needed to perform such step and the extra stacking table makes such machine complex and costly.

It is an object of this invention therefore to provide a stacking machine of this type which will count a stream of papers in overlapped form, deposit them in a balanced bundle on a single table, and transfer the bundle to a bundle delivery conveyer.

Another object of this invention is to provide a stacking machine of this type which uses standard paper conveyer parts in the counting and intercepter sections thereof, can be directly connected with an existing newspaper conveyer with little change in such conveyer, and functions at the rate of such conveyer or at a higher rate.

Another object is to provide a stacking machine of this type which is less complex and less expensive than the present machines of such types.

A further object is to provide a [method of and] mechanism for counting newspapers or the like while in overlapped direct delivery flow with folded edge leading, continuously determining the rate of said flow and employing such rate and such count to stack papers in a bundle of predetermined number.

A still further object of this invention is to provide a stacking machine of this type which will form balanced bundles of papers made up of several reversely positioned batches.

Such a machine has a counting section, an intercepting section, a stacking blade section, and a table section. In the counting section the flow of papers in direct delivery on a double wire belt conveyer section moves through a curved path while the papers are constrained from the outer side of such path only at one side. One at a time the unsupported side of each paper will momentarily cut across a light beam located on the outside of such path. Thus the papers are counted without changing from the overlapped flow. From the counting section the flow of overlapped papers continues on a wire belt conveyer into the intercepting section. In this section a double wire belt conveyer section is directed angularly downward and the rollers at the delivery end are swingably mounted to move such end from a lower to an upper delivery station. An intercepting blade has an upper station above said lower delivery station and below said upper delivery station. It moves downwardly from its upper station to a lower station above the stacking blade section. The intercepting blade is withdrawn from the path of paper flow during its return from lower to upper station. The stacking blade section has movable blades which separate to let a batch of newspapers formed thereon drop onto the table section. In the table section a vertically movable and rotatable table has fixed vertical guides to hold the batches of papers received by it until a bundle is formed. As it moves downwardly a series of wheels located below enter into spaces in the table and engage the bottom of the bundle to remove it laterally to a bundle conveyor. Between receiving batches, the table is rotated 180° so that the bundle is balanced. That is, the folded edges of the papers are distributed on opposite sides of the bundle. The movements of the delivery end of the intercepting section conveyor, the intercepting blades, the stacking blades, and the table are effected through air cylinders with solenoid air valves and springs with a solenoid latch. Limit switches operated by the air cylinders; relays energized by an electronic paper counter; a first and second delay counter, both receiving impulses from a paper flow rate pulsing wheel; a pressure limit switch reversing circuit; and stepping relay form the control and synchronizing system. When the paper counter records the end of the batch count, the first delay counter registers the pulses from the pulsing wheel (the paper counter resets and starts counting again) to delay action (depending upon flow rate) until the leading edge of the last paper of the batch reaches the intercepting blade. At this instant the delivery end moves to its upper station and the first paper of the new batch with following papers slides onto the top of such blade. The second delay counter now registers such pulses for the time required for the last paper of the first batch to settle on top of such batch on the stacking blades. These blades are then moved apart and the first batch drops on the table. This table is then rotated through 180°. Upon opening of the stacking blades, the intercepting blade moves down to its lower station just above the stacking blades. When the stacking blades close, the intercepting blade is retracted from under the batch then being collected on it. The intercepter while in retracted position moves to its upper station, the delivery end of the conveyer in the intercepting section having in the meanwhile returned to its lower delivery station. The same sequence of events follows as the last paper of the second batch passes the counting section, with the exception that the table is not rotated but instead is lowered so that the bundle comprising the two batches is carried off by the wheels onto a bundle delivery conveyer. When the bundle clears the table it operates limit switches and the table is raised to its upper position in preparation for a repeat of the described sequence of operations. Thus there is eliminated from this stacking machine mechanism for spacing the newspapers and the machinery for a second table and bundle delivery, and consequently the machine is less complex and costly and operates at commercially practical speeds.

The novel features, which are considered characteristic of the invention, are set forth with particularity in the appended claims. The invention itself, however, both as to its organization and its [method] *mode* of operation, together with additional objects and advantages thereof, will best be understood from the following description of a specific embodiment when read in connection with the accompanying drawings, in which:

Figure 8:
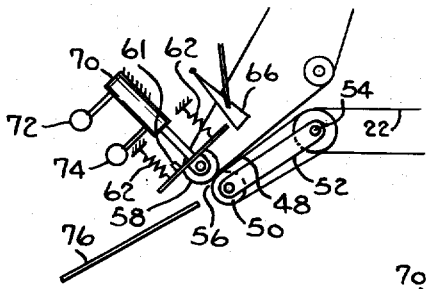
FIG. 8 is a fragmentary view in side elevation of such stacking machine showing the delivery end of the conveyer in the interception section in its upper delivery station.

The stacking machine shown in the drawing is mounted on a conventional frame (not shown) which may be interconnected with the frame of a standard newspaper wire belt conveyer from which the stacking machine receives newspapers. The drive for the wire belt conveyers of the stacking machine may be taken from an input section 10 of the newspaper conveyer or there may be an individual drive 11 (see FIG. 7) to operate the conveyers of the stacking machine at a minimum speed. Such drive should be connected through an overrunning clutch so that when the input section speed exceeds the speed of such individual drive the input section will take over the drive of the stacking machine conveyers.

For the purpose of this description the stacking machine will be divided into four major operating sections. These are: (1) a counting section; (2) an intercepting section; (3) a batch stacking section; and (4) a table or bundle stacking and handling section.

COUNTING SECTION

Figure 3:
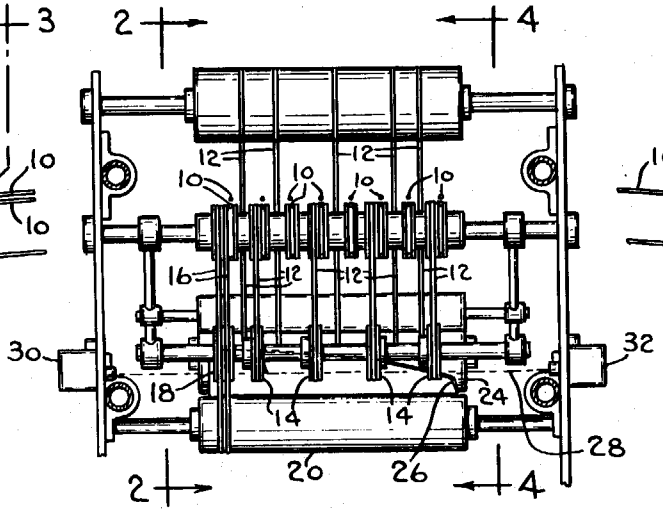
FIG. 3 is a fragmentary sectional view taken on the line 3—3 of FIG. 2.
Figure 2:
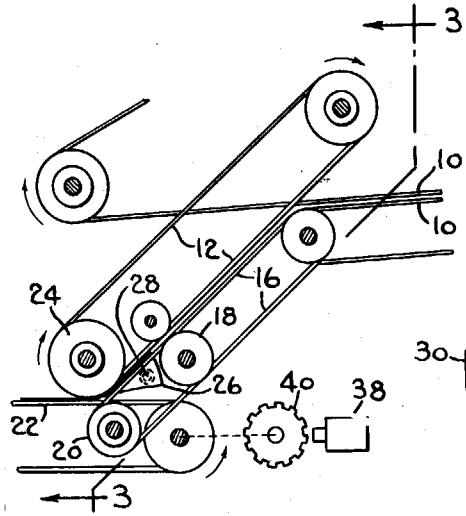
FIG. 2 is a fragmentary sectional view taken on the line 2—2 of FIG. 3.

In the counting section the newspapers are delivered from the input conveyer 10 to a double run conveyer 12 inclined downwardly at approximately 45° to the horizontal. All the wire belts of the lower run of such conveyer 12 follow around pulleys 14 (see FIG. 3) except the two end belts 16. These end belts ride over a supporting double pulley 18 and pass around a roller 20 positioned below the top of a horizontal conveyer 22. As newspapers in the overlapped flow heretofore described travel down conveyer 12 they will bend around a roller 24 in the top run of such conveyer as they move on to the horizontal conveyer 22. The left-hand edge of such newspapers (as viewed in FIG. 3) will be restrained by the two end belts 16 but the right-hand edge 26 of each newspaper being unrestrained will flip downwardly and outwardly of the path of flow as each such newspaper leaves the support of the lower run of the conveyer 12 at the pulleys 14. Each newspaper will hence intercept a light beam 28 passing from a light source 30 to a photoelectric cell 32 as each paper flips from the bottom of the flow. Each newspaper travels out of the light beam to let it re-establish before the succeeding paper is released from the pulleys 14. Hence, the count is positive. The count of the photoelectric cell 32 is recorded on an electronic paper counter 34 (see FIG. 7) such as described in said Hansen and Ormsby application which after recording a preselected number of newspapers (say 25) sends an impulse to the first delay counter 36 (see FIG. 7) which is then triggered so that it registers the impulses from a magnetic pick-up coil 38 in which voltage is induced by the teeth of a toothed wheel 40 mounted on a conveyer shaft and rotating in timed relation with the speed of the conveyers in the stacking machine. No matter what the speed of the conveyers the time required for one newspaper to travel from the light beam 28 to the intercepting blade will always be automatically determined by a predetermined set count established in the first delay counter 36. Upon reaching the predetermined count in the first delay counter 36, it will trigger a second delay counter 42 (see FIG. 7) which then receives the impulses from the pickup coil 38 and measures the time required for the last newspaper of a batch to enter below the intercepting blade and settle on top of a batch being formed on the stacking blades. The electronic paper counter 34 and the electronic first delay counter are adjustable from 0 to 100. The second electronic delay counter is adjustable from 0 to 20. All counters are standard equipment and their details form no part of this invention. They receive power from a power supply 43 connected across the line. As seen from FIG. 7 the delay counters 36 and 42 have normally open contacts 44 and 46 respectively which control relays hereinafter described. All the counters are automatically resetting. The first and second delay counters 36 and 42 hold their contacts closed about 120 milliseconds to provide sufficient time for the operation of the relays and solenoids hereinafter described.

INTERCEPTING SECTION

In the intercepting section of the stacking machine the newspapers are delivered from the horizontal conveyer 22 to a double run delivery conveyer 48 inclined downwardly at an angle of approximately 40°. This angle has been found preferable for the stacking of the papers in the stacking section. The wire belts of the bottom run of this conveyer pass around a roller 50 which by means of pivoted members 52 may move up and down in an arc about a shaft 54 of the horizontal conveyer so that the delivery end 56 may be swung from its lower delivery station shown in FIG. 1 to its upper delivery station shown in FIG. 8. The wire belts of the upper run of this conveyer pass around a roller 58 mounted on a slide 60 permitting it to move upward about one inch along a line substantially tangent to the arc of travel of the roller 50 to a stop 61. The slide 60 is attached to tension springs 62 which bias the roller 58 to the upper delivery station. Springs 64 continually urge the roller 50 against the roller 58 so that it follows the movement of the latter roller and can move down relative thereto as the stream of newspapers passes through the delivery conveyer 48 to maintain proper pressure on such stream. The delivery end 56 is locked in the lower delivery station by a pivoted latch 66 which is normally urged to the locked position shown in full lines and is swung to the unlatched position shown in broken lines by a solenoid 68 when such solenoid is energized. When unlatched the delivery end 56 rapidly moves to the upper delivery station and the newspaper then [overlapping] *underlapping* the intercepting blade [remains below such blade] *engages on its upper surface against such blade and remains therebelow* while the succeeding newspapers slide onto the top of such blade. The delivery end 56 is returned to its lower delivery station by an air cylinder 70 controlled by solenoid air valves 72 and 74. Energizing valve 72 accomplishes such resetting and valve 74 is automatically energized to return the ram to inoperative position. The latch 66 will automatically drop into locked position as such delivery end reaches such lower station. The rollers 50 and 58 may consist of two sections, each section tilted at a slight angle to bend the newspapers as they pass through the delivery end so that the leading edge will not sag down as it leaves such rollers.

An intercepting blade 76 has an upper station in the intercepting section as shown in the full lines. Such blade is mounted on the ram of an upwardly inclined air cylinder 78 and is retracted from the intercepting section by the energizing of a solenoid air valve 80 and returned by the energizing of a solenoid air valve 82. A normally open limit switch 84 is closed when such blade is retracted. The inclined cylinder 78 is mounted by a carriage 86 to the ram of a vertical air cylinder 88 and the blade 76 is lowered and raised under the control of solenoid air valves 90 and 92. Energizing valve 90 lowers the blade 76 and energizing valve 92 raises it. The sequence is always: lower, retract, raise, advance. A normally open limit switch 94 is closed as the intercepting blade 76 starts down and a normally open limit switch 96 is opened when such blade reaches its lower position just above the stacking blades.

The intercepting section includes spaced end walls or batch guides 98 against which the folded edges of the newspapers strike to aline the batch as it is being formed in such section. The intercepting blade 76 slides in between such end walls which extend above the upper station thereof so that the batch may start forming above such blade.

BATCH STACKING SECTION

Figure 6:
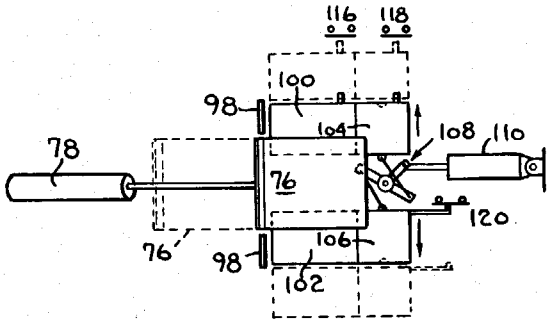
FIG. 6 is a fragmentary sectional view taken on the line 6—6 of FIG. 1.
Figure 5:
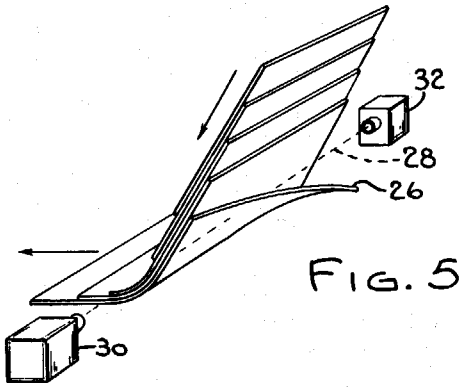
FIG. 5 is a fragmentary perspective view illustrating the manner in which each newspaper of an overlapped stream cuts a light beam in the counting section.

The batch stacking section consists of two blades 100 and 102 (see FIG. 6) mounted on members 104 and 106 at an inclination of approximately 30° to the horizontal. The members 104 and 106 are slidably carried on the frame so that the stacking blades 100 and 102 may be moved from the batch forming postition shown in the full lines to the dumping or open position shown in the broken lines of FIG. 6. In the closed position the blades are spaced the maximum distance which will still provide stable support for the batch, thus lessening the distance which the blades must travel to the open position and minimizing the time required to drop the batch onto the table. The movement of such blades is accomplished by a pivoted crank 108 linked to each of the members 104 and 106 and rotated by the ram of an air cylinder 110. This cylinder is controlled by solenoid air valves 112 and 114. Energizing valve 112 opens the gates and energizing valve 114 closes them. Normally open limit switches 116 and 118 are closed when the stacking blades reach the open position. A normally closed limit switch 120 is opened as the stacking blades leave the closed position.

TABLE OR BUNDLE STACKING SECTION

The batches of newspapers that are formed in the batch stacking section upon the opening of the stacking blades 100 and 102 fall onto a table 122 which has rigidly secured guiding members 124 to supoprt each batch and the bundle formed by several of such batches. The ends of the table are unobstructed so that a bundle may be moved endwise from the table to a bundle conveyor (not shown). The table 122 has a plurality of spaced openings (not shown) to receive the constantly rotating wheels 126 driven by a motor 128 (see FIG. 7). The table is lowered so that the wheels 126 will engage the bottom of a bundle of newspapers and remove it from the table by an air cylinder 130 controlled by solenoid air valves 132 and 134. Energizing valve 132 lowers the table and energizing valve 134 raises it. Normally open limit switches 136 and 138 are closed by a mechanism 140 which is operated by the bundle after it has cleared the table 122.

The table 122 is supported on the ram of the air cylinder 130 in such manner as permits its rotation back and forth through 180°. Thus the first batch of newspapers received by the table will have the folded edges thereof toward one side of the table and the next batch received, by reason of rotating the table, will have its folded edges on the other side of the table. The bundle will therefore be balanced and stable. The rotation is accomplished by gearing 142 connected by a crank 144 to the ram of an air cylinder 146. There is limited axial sliding movement between the gearing and table support to permit raising and lowering of the table. The air cylinder 146 is controlled by solenoid air valves 148 and 150. Separately energizing valves 148 and 150 cause the table 22 to rotate from one to the other of its 180° extreme positions. The air cylinder 146 has associated with it two normally closed pressure limit switches 152 and 154 which open as the pressure alternately develops in such air cylinder.

CONTROL SYSTEM AND OPERATION

Figure 7:
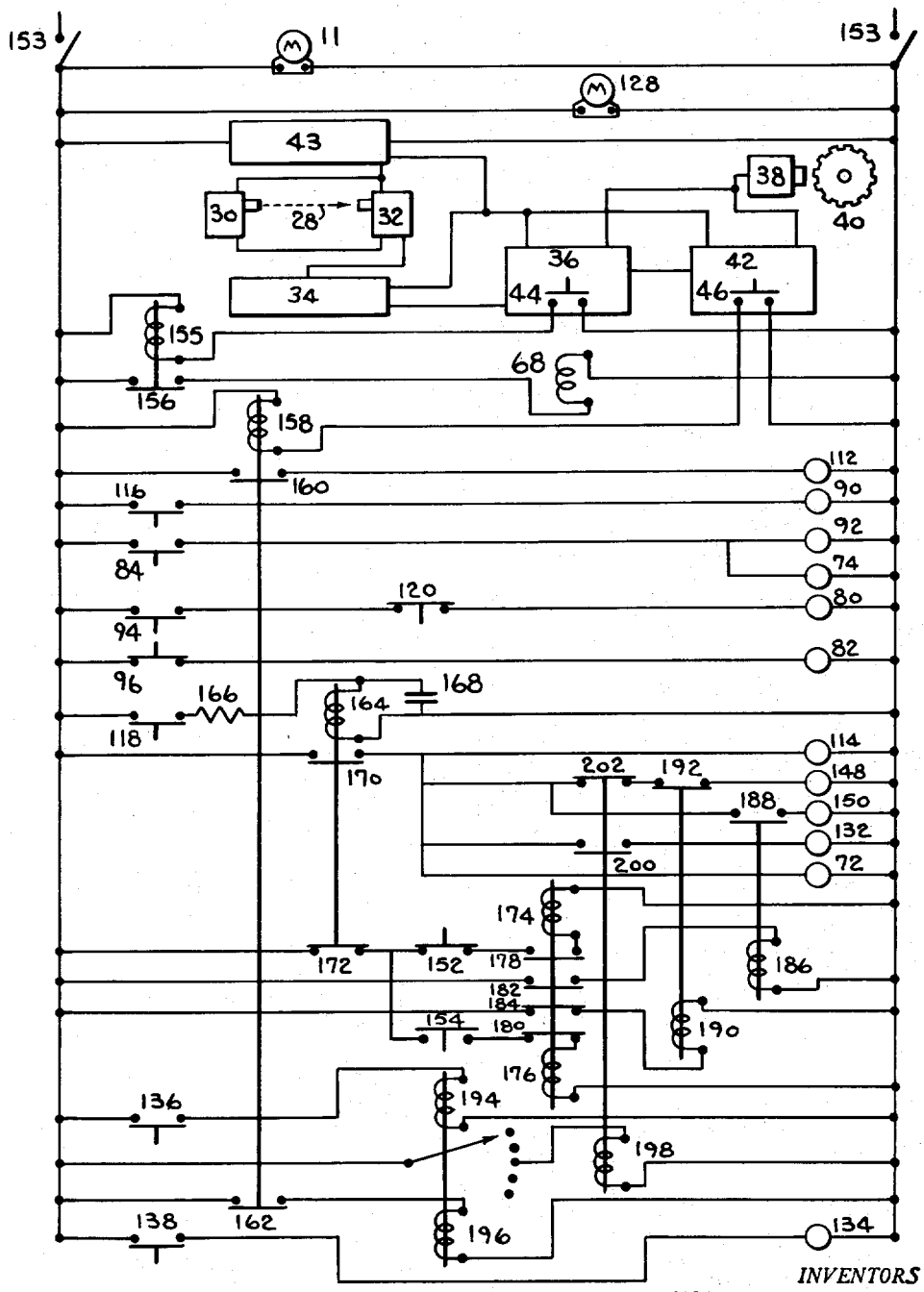
FIG. 7 is a schematic diagram of the electrical controls for such stacking machine.

In addition to the counters 34, 36, and their power supply 43, the impulse pick-up 38, various solenoid air valves, and limit switches heretofore described, the control system also includes in the circuits shown in FIG. 7 several control relays. Relay coil 155 is in circuit with the contacts 44 and when energized closes its normally open contacts 156 to energize solenoid 68 and unlock latch 66. The ram of cylinder 70 being then retracted by a bleeder opening in the air solenoid 74 to permit the delivery end 56 to raise. Relay 158 is in circuit with the contacts 46 and when energized closes its normally open contacts 160 to energize valve 112, momentarily opening the stacking blades 100 and 102, and closes its normally open contacts 162 to energize the coil 196 and advance a stepping relay one step for each such closing. Relay coil 164 shunted by a capacitor 168 is in circuit with limit switch 118 and a resistance 166 so that there is a short time delay before such relay coil pick-ups after closing of switch 118. The drop across the resistance is initially large due to the charging current drawn by the capacitor. When this charging current drops off, the relay picks up. The delay is sufficient to let a batch of newspapers drop from the blades 100 and 102 when opened to the table 122. When the relay 164 is energized it closes its normally open contacts 170 and opens its normally closed contacts 172. The closing of contacts 170: (1) energizes valve 114 and closes the stacking blades 100 and 102; (2) energizes valve 148 through contacts 202 and 192 to rotate the table 122; and (3) energizes valve 72 to lower the delivery end 56 and relock the latch 66. The momentary opening of contacts 172 permits the pressure limit contact 154 to be closed by the rotation of the table 122 without operating the mechanically held relay during such rotation. The mechanical relay has one coil 174 in a circuit controlled by the pressure limit switch 152 and shifting contacts 178, and the other coil 176 is in a circuit controlled by the other pressure limit switch 154 and the shifting contacts 180. The mechanical relay is shifted from the position shown when relay 164 is de-energized upon the closing of the stacking blades 100 and 102. The mechanical relay alternately closes contacts 182 and 184. Contacts 182 close to energize relay coil 186, close contacts 188, and place valve 150 in condition for the second rotation of the table 122 after the stacking blades 100 and 102 have again opened to close the limit switch 118. Contacts 184 are opened to de-energize relay 190 and open contact 192 to keep valve 148 from opening valve 150 during the second rotation. The limit switch 136 closes as a bundle leaves the table 122 to energize a reset coil 194 of a stepping relay having adjustable settings. The closing of the relay contacts 162 energizes a stepping coil 196 of such stepping relay. The stepping arm is moved to the first step just before the first batch is dropped from the stacking blades 100 and 102 and is moved to the second step just before the second batch is dropped. The second step of the stepping relay is connected with a relay coil 198 which when energized opens normally closed contacts 202 to prevent energization of valve 148 and the rotation of the table 122 after the second (and last) batch is dropped. The energization of relay 198 also closes normally opened contacts 200 to energize valve 132 right after the second batch is dropped and lower the table 122.

Figure 1:
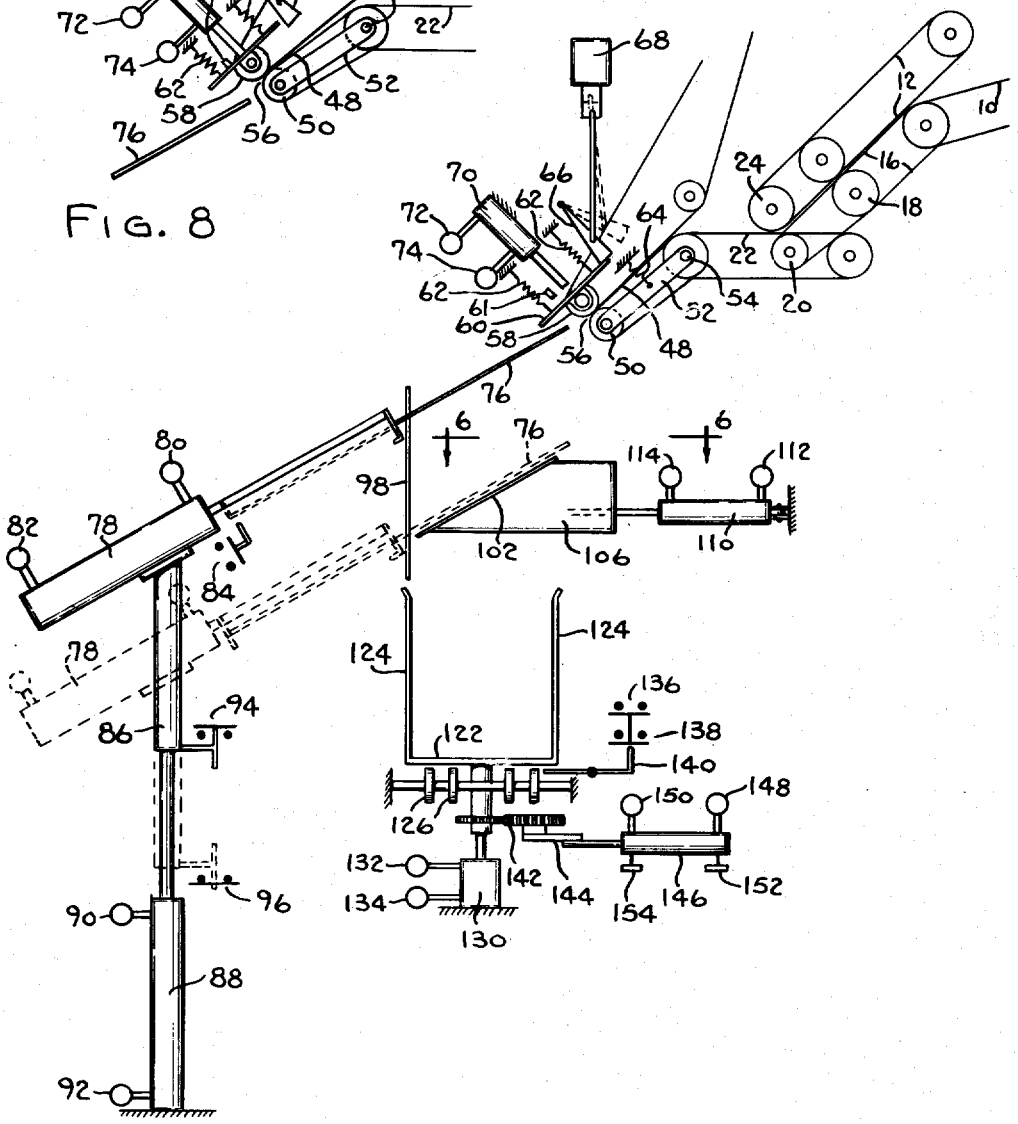
FIGURE 1 is a view in side elevation of a stacking machine embodying the present invention with the structural framework omitted and some of the parts being shown diagrammatically.
Figure 4:
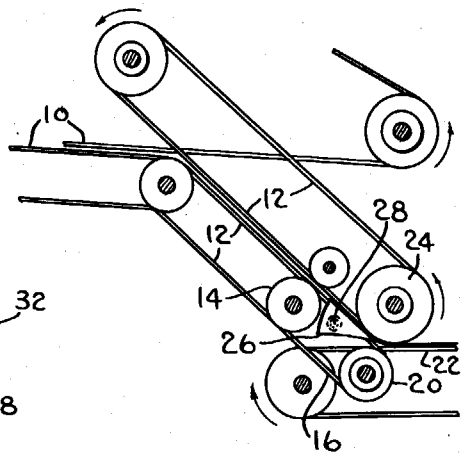
FIG. 4 is a fragmentary sectional view taken on the line 4—4 of FIG. 3.

In the following description of the sequence of operation, the stacking machine is started from the at-rest position shown in FIG. 1 with no papers in the machine and with the parts positioned as shown by the full lines of FIG. 1 and the relays positioned as shown in FIG. 7, except that relay 190 is shown with its contact 192 closed in the position assumed after the manual switches 153 are closed. FIG. 7 also shows the position assumed by the air cylinders when pressure is applied to them. Solenoid air valves 74, 82, and 92 have bleeder openings to keep the ram of cylinder 70 free of the slide 60 and the intercepter blade 76 in raised and advanced position. Since the ram of cylinder 146 is retracted, normally closed pressure switch 154 is open. It is also assumed that paper counter 34 is set to count 25 newspapers to each batch and that the first and second delay counters 36 and 42 are set as heretofore described.

As each newspaper cuts the beam 28 the counter 34 will register the impulses from the cell 32 and when the 25th newspaper cuts such beam such counter will reset and send a pulse to the first delay counter 36 to trigger it so that it registers the pulses from the pick-up coil 38. At the time the folded edge of the 25th newspaper reaches the tip of intercepting blade 76 the first delay counter 36 will reset sending a triggering pulse to the second delay counter 42, and also close contacts 44, thereby energizing relay 155 to let the delivery end 56 move up so that the 26th and succeeding newspapers are fed to the top of the intercepting blade 76. The contacts 44, because of a delay built-in counter 36, will remain closed about 120 milliseconds to permit the complete tripping of latch 66. Thereafter such latch will be ready to again drop into latched position.

At the time the 25th newspaper reaches the top of the first batch on the blades 100 and 102, the second delay counter 42 will reset and also close contacts 46 for 120 milliseconds, energizing relay 158 to open blades 100 and 102 and advance the stepping relay one step to the first position (unconnected). The first batch of newspapers drops onto the table 122.

The opening of the blades 100 and 102 closes limit switches 116 and 118 and opens limit switch 120. The closing of switch 116 energizes valve 90 and the intercepting blade is moved to its lower position. During such movement limit switch 94 is closed but ineffective because limit switch 120 is open. The closing of switch 118, energizes relay 164, which after a time delay, picks-up to effect closing of the blades 100 and 102, turn the table 122 through 180°, and lower the delivery end 56. The opening of limit switch 120 prevents the energization of valve 80 when limit switch 94 closes at the time the intercepting blade 76 starts moving down, thus locking such blade during lowering. The closing of the stacking blades 100 and 102 opens limit switch 116 to deenergize valve 90 and free blade 76 for raising, opens limit switch 118 to shift the mechanical relay, and closes limit switch 120. Since limit switch 94 is now closed and limit switch 96 open (with valve 82 de-energized), the valve 80 will be energized, retracting the intercepting blade 76 and holding it retracted until switch 94 is opened, when such blade reaches its upper position. Such retraction closes limit switch 84 to energize valves 92 and 74. This raises the intercepting blade 76 (while retracted) and raises the ram of cylinder 70 out of the way where it will remain. When such blade reaches its upper station, the limit switch 94 will open de-energizing valve 80, letting valve 82, which had been energized by the closing of limit switch 96 upon the start of the upward travel, drive the intercepting blade forward into the intercepting station. The second batch of newspapers is now being formed on the closed batch blades 100 and 102 and the intercepting section is in readiness for a repeat sequence.

When the 25th newspaper of the second batch cuts the beam 28 the same sequence of events will repeat in the manner described with one exception. The stepping relay arm will take its second step and be connected with relay 198. When limit switch 118 closes (stacking blades opening), the valve 132 will be energized instead of valve 148. This causes the table 122 to lower and the bundle to be carried out by the wheels 126. When the bundle has cleared the table, the limit switches 136 and 138 will close, resetting the stepping relay and energizing valve 134 to raise the table. The device is then set for formation of the first batch of the second bundle and so on.

Although only one embodiment of the invention is shown and described herein, it will be understood that this application is intended to cover such changes or modifications as come within the spirit of the invention or scope of the following claims:

We claim:

1. In a mechanism for handling units of flexible material flowing in a lapped stream which has a first side defined as the side on which the exposed portions of the lapped units are leading and a second side defined as the side on which the exposed portions of the lapped units are trailing, a counting section comprising opposed supports between which said stream is carried, a break in the support adjacent said second side, a guide in said break engaging said stream along one side only thereof, means for causing the unsupported side of each unit to move outwardly of said stream as such unit passes through said break, and a counting mechanism including a light beam extending from side to side of said counting section at said break and adjacent said stream so as to be cut by the unsupported outward portion of each unit.

2. The combination according to claim 1 in which said means includes a change in direction at the outgoing end of said break toward said first side whereby the unsupported part of the trailing exposed part of each unit is flipped outwardly of said stream in said break.

3. The combination according to claim 2 in which said second side of said units is facing downwardly so that the force of gravity will assist the outward flipping of said unsupported part.

4. The combination according to claim 2 in which said change of direction afforded by said means is from an inclined path to a horizontal path.

5. In a stacking machine for units of flexible material flowing in a lapped stream which has a first side defined as the side on which the exposed portions of the lapped units are leading and a second side defined as the side on which the exposed portions of the lapped units are trailing, a counting section comprising an inclined wire belt conveyer having a lower run and an upper run, a horizontal wire belt conveyer having its top adjacent the lower end of said upper run, said lower run terminating above said top a sufficient distance to release the trailing edge of a unit after the leading edge thereof has reached said horizontal conveyer, a supporting wire belt extending from the lower end of said lower run to the top of said horizontal conveyer at one side only of said conveyers, and counting mechanism including a light beam extending from side to side of said stream adjacent the outer side of said supporting wire belt.

6. In a stacking machine for units of flexible material flowing in a stream, a station for forming said stream into batches of units with alined edges comprising, a conveyer for said stream having a delivery end from which said stream is delivered, a guide member against which the leading edges of the units in the stream strike to aline the edges thereof to form a batch, and a combination directing and storing blade having a tip normally positioned adjacent and above said delivery end, slightly spaced from one side of said units along the center line of said stream, said blade and said delivery end being relatively movable vertically to bring said tip against said one side of a unit in said stream to direct said unit below the lower side of said blade against said guide member and to direct succeeding units on the upper side of said blade to store them thereupon against said guide member.

7. In a stacking machine for units of flexible material flowing in a lapped stream which has a first side defined as the side on which the exposed portions of the lapped units are leading and a second side defined as the side on which the exposed portions of the lapped units are trailing, a station for forming said stream into batches of units with alined edges comprising, a conveyer for said stream having a delivery end from which said stream is delivered, a guide member against which the leading edges of units in said stream strike to close the lap between units and aline the edges thereof to form a batch, and a combination directing and storing blade having a tip normally positioned adjacent and above said delivery end, slightly spaced from said first side and along the center line of the stream, said blade and said delivery end being relatively movable vertically to bring said tip against the leading exposed surface of a unit in said stream to direct said unit below the lower side of said blade against said guide member and to direct the succeeding lapped units on the upper side of said blade to store them thereupon against said guide member.

8. The combination according to claim 7 in which said conveyer and said blade are inclined to the horizontal and said guide member is vertical whereby the lap between said units is more readily closed.

9. The combination according to claim 7 in which there is a batch collecting member stationed below said blade and movable laterally to and from batch holding and batch dumping stations, and in which the relative motion of said blade and delivery end is effected prior to the movement of said collecting member from holding to dumping stations.

10. The combination according to claim 9 in which said conveyer and said blade are inclined to the horizontal and said guide member is vertical whereby the lap between said units is more readily closed.

11. The combination according to claim 10 in which there is means to vertically move said intercepting blade down toward said collecting member while said collecting member is moving from holding to dumping to holding stations following storing of a unit upon said blade.

12. The combination according to claim 11 in which there is means to elevate said intercepting blade when from the batch collecting side of said guide member after said collecting member has returned to holding station.

13. The combination according to claim 11 in which there is means to elevation said intercepting blade when retracted and when so elevated to advance said blade into said normal position.

14. In a stacking machine for units of flexible mattrial flowing in a lapped stream which has a first side defined as the side on which the exposed portions of the lapped units are leading and a second side defined as the side on which the exposed portions of the lapped units are trailing, a stacking station for forming said stream into batches of units with alined edges comprising, a conveyer for said stream having a delivery end from which said stream is delivered, said delivery end being movably biased from a normal delivery position to an intercepting position, a guide member against which the leading edges of units in said stream strike to close the lap between said units and aline the edges thereof to form a batch, an intercepting blade normally positioned adjacent and above said first side of said stream along the center line of the latter as it leaves said delivery end when in normal delivery station, said blade contacting the upper exposed surface of a unit as said delivery end moves vertically to said intercepting position to carry the succeeding unit to the upper side of said blade, and means for holding and controlling the movement of said delivery end.

15. In a stacking machine for units of flexible material flowing in a lapped stream, a conveyor having a counting section comprising means registering the passage of a predetermined number of units and having a delivery end, an intercepting blade in line with and adjacent said delivery end, said delivery end being movable vertically to effect storing of units of the stream upon said blade following passage of the last unit of a predetermined number below said blade, elements which in closed position provide a stacking section on which said predetermined number of units are alined and stacked in a batch, said elements moving laterally apart to freely drop a batch while following units are temporarily stored upon said intercepting blade, and a table disposed below said elements to receive batches of units dropped therefrom and being rotatable between receipt of each batch to provide balanced bundles.

16. In a stacking machine for units of flexible material flowing in a stream in overlapped and contacting relation, a conveyor having a counting section comprising means registering the passage of predetermined numbers of units and having a delivery end, an intercepting blade in line with and adjacent said delivery end, means providing relative movement of said delivery end and said blade transversely of the plane of the stream to exect separation of the lapped stream and storing of units of the stream upon said blade following passage of the last unit of a predetermined number below said blade, and a stacking section in which a predetermined number of units are stacked in a batch with their leading edges alined and comprising support means movable to remove support from a completed batch to freely drop the latter while following units are temporarily stored upon said intercepting blade.

17. The combination according to claim 16 in which an electrical control system including delay means synchronized with the speed of said stream effects said relative movement of said delivery end and said intercepting blade when the last predetermined unit registered in said counting section enters said stacking section and moves said support means of said stacking section when such last unit is stacked thereupon.

18. The combination according to claim 15 in which air cylinders having air solenoid valves controlled by an electrical control system including delay means, limit switches, and relay vertically move said delivery end of the conveyor when the last predetermined unit registered in said counting section enters said stacking section, move said elements of said stacking section when such last unit is stacked thereupon, and rotate said table after one batch has been received and before the next batch is received.

19. The combination according to claim 16 together with a table disposed below said support means to receive a completed batch dropped therefrom.

20. The combination according to claim 19 wherein means associated with said table operate to remove a completed batch from said table.

21. The combination according to claim 19 wherein said table is provided with means affording it rotation between receipt of each completed batch to provide balanced bundles comprising at least two such batches.

22. The combination according to claim 21 wherein a control system including delay means synchronized with the speed of the stream effects said relative movement of said delivery end and said intercepting blade transversely of the plane of the stream when the last unit of a predetermined number registered in counting section enters said stacking section, moves said support means of said stacking section when such last unit is stacked thereupon, and while units are being stacked in said stacking section rendering said table rotating means operable between receipt of each batch thereon and rendering said means associated with said table operable when a preselected number of batches have been received on said table.

References Cited in the file of this patent or the original patent

UNITED STATES PATENTS

| | | |
|---|---|---|
| 2,122,710 | Bidwell et al. | July 5, 1938 |
| 2,133,263 | Wolff | Oct. 11, 1938 |
| 2,375,241 | Lindgren et al. | May 8, 1945 |
| 2,414,059 | Powers | Jan. 7, 1947 |
| 2,484,196 | Turrall et al. | Oct. 11, 1949 |
| 2,485,943 | Turrall | Oct. 25, 1949 |
| 2,606,483 | Forbes | Aug. 12, 1952 |